Patented June 24, 1930

1,766,715

UNITED STATES PATENT OFFICE

MARTIN LUTHER, OF MANNHEIM, AND HANS BELLER, OF OPPAU, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF LACTIC ACID AND ITS DERIVATIVES

No Drawing. Application filed February 4, 1928, Serial No. 252,039, and in Germany February 12, 1927.

This invention relates to the production of lactic acid or its derivatives by the fermentation of materials containing carbohydrates.

In the production of lactic acid by the fermentation of low-grade initial materials, such as molasses or potatoes, the purification of the lactate is known to be a matter of difficulty. The coloring and mucinous substances and the other impurities, present in the crude lactate can only be got rid of by difficult and wasteful methods of purification, such as repeated recrystallization.

We have now found that when molasses or potatoes, for example, or similar impure initial materials containing carbohydrates are employed, a high-grade lactate can be directly produced by extracting the residue obtained by evaporating the fermented and neutralized mash with methanol. According to this method of working practically the whole of the lactate may be recovered from the evaporation residue, which, when calcium carbonate has been used for neutralizing, contains the lactic acid in the form of calcium lactate. After the extraction medium has been driven off, a crude product containing over 90 per cent of calcium lactate is obtained. The lactate may also be advantageously recovered, in a pure state, from the methanol solution by precipitation, as for example with acetone or methyl formate.

The lactic acid may be liberated from the lactate with mineral acids. If it is desired to produce esters, for example the methyl ester of lactic acid, it is advisable either to directly esterify the methyl-alcoholic lactate solution, obtained by the extraction process or to evaporate it, the residue being then dissolved in methanol or another alcohol and subjected to esterification.

The following examples will further illustrate the nature of the said invention which however is not limited thereto. The parts are by weight.

Example 1

1 part of the residue obtained by evaporating a fermented potato mash, neutralized with lime, is extracted with 5 parts of methanol at from 35° to 40° C. until the amount of lactate in the residue has fallen to below 3 per cent. After expelling the extraction agent by distillation, the extraction product, which contains 92 per cent of calcium lactate, is brought into the desired form for use by any known or suitable method.

Example 2

The dry extraction product as obtained according to Example 1 dissolved in an alcohol, or the concentrated solution of lactate in methyl alcohol obtainable in the process described in the foregoing example, is treated with such an amount of sulphuric acid as is required for the liberation of the lactic acid from its salt and then boiled for several hours under a reflux condenser until esterification is completed. After filtering off the deposited calcium sulfate, the solvent is expelled by distillation, and the lactic ester recovered by distilling in vacuo.

What we claim is:

1. A process for the production of derivatives of lactic acid from the residue containing a lactate obtained by the evaporation of the neutralized fermentation product of materials containing carbohydrates, which comprises extracting the lactate from the said residue with methanol.

2. A process for the production of lactic acid from the residue containing a lactate obtained by the evaporation of the neutralized fermentation product of materials containing carbohydrates, which comprises extracting the lactate from the said residue with methanol, and decomposing the lactate by means of a mineral acid.

3. A process for the production of lactic acid which comprises neutralizing a fermented potato mash with lime, extracting the residue obtained by evaporation thereof with methanol, and decomposing the lactate thus obtained by means of a mineral acid.

In testimony whereof we have hereunto set our hands.

MARTIN LUTHER.
HANS BELLER.